US011815360B2

(12) United States Patent
Lim et al.

(10) Patent No.: US 11,815,360 B2
(45) Date of Patent: Nov. 14, 2023

(54) METHOD FOR PREDICTING THE DESTINATION LOCATION OF A VEHICLE

(71) Applicant: GRABTAXI HOLDINGS PTE. LTD., Singapore (SG)

(72) Inventors: Xiang Hui Nicholas Lim, Singapore (SG); See Kiong Ng, Singapore (SG); Kuen Yew Bryan Hooi, Singapore (SG); Renrong Weng, Singapore (SG); Jagannadan Varadarajan, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 17/922,152

(22) PCT Filed: Apr. 30, 2020

(86) PCT No.: PCT/SG2020/050261
§ 371 (c)(1),
(2) Date: Oct. 28, 2022

(87) PCT Pub. No.: WO2021/221563
PCT Pub. Date: Nov. 4, 2021

(65) Prior Publication Data
US 2023/0194288 A1    Jun. 22, 2023

(51) Int. Cl.
*G01C 21/00* (2006.01)
*G01C 21/36* (2006.01)
(Continued)

(52) U.S. Cl.
CPC ......... *G01C 21/3617* (2013.01); *G06N 3/044* (2023.01); *G06N 3/045* (2023.01); *G06N 3/08* (2013.01); *G06Q 50/30* (2013.01)

(58) Field of Classification Search
CPC .... G01C 21/3617; G06N 3/045; G06N 3/044; G06N 3/08; G06Q 50/30
(Continued)

(56) References Cited

U.S. PATENT DOCUMENTS 8,754,777 B1    6/2014   Mendis
8,949,013 B2    2/2015   Yang et al.
(Continued)

FOREIGN PATENT DOCUMENTS

CN    110991713    4/2020
EP    3 179 434    6/2017

OTHER PUBLICATIONS

Canghong Jin, Zhiwei Lin, and Minghui Wu, "Augmented Intention Model for Next-Location Prediction from Graphical Trajectory Context," Dec. 26, 2019, Hidawi, Wireless Communications and Mobile Computing, vol. 2019, Article ID 2860165, whole document. (Year: 2019).*

(Continued)

*Primary Examiner* — Tyler J Lee
*Assistant Examiner* — Tiffany P Ohman
(74) *Attorney, Agent, or Firm* — Buckley, Maschoff & Talwalkar LLC

(57) ABSTRACT

Disclosed are systems and methods for predicting the destination location of a vehicle by processing a local preference graph of a user of the vehicle having nodes corresponding to locations visited by the user. In some embodiments, information about locations which have been visited one after another by users and the time between visits of the locations are also used in the prediction.

22 Claims, 9 Drawing Sheets

(51) Int. Cl.
G06N 3/045 (2023.01)
G06N 3/044 (2023.01)
G06N 3/08 (2023.01)
G06Q 50/30 (2012.01)

(58) Field of Classification Search
USPC .......................................................... 701/400
See application file for complete search history.

(56) References Cited

U.S. PATENT DOCUMENTS

| | | | |
|---|---|---|---|
| 9,470,538 | B2 | 10/2016 | Jackson et al. |
| 9,594,808 | B2 | 3/2017 | Gyongyi et al. |
| 2010/0131187 | A1 | 5/2010 | Lai et al. |
| 2013/0024203 | A1 | 1/2013 | Flores et al. |
| 2017/0268886 | A1 | 9/2017 | Tang et al. |
| 2019/0205355 | A1 | 7/2019 | Moore |
| 2020/0174490 | A1* | 6/2020 | Ogale ................... G06N 3/084 |

OTHER PUBLICATIONS

Basmah Altaf, Lu Yu, and Xiangliang Zhang, "Spatio-Temporal Attention based Recurrent Neural Network for Next Location Prediction," 2018, IEEE, International Conference on Big Data, whole document. (Year: 2018).*

Quan Yuan, Gao Cong, and Aixin Sun. 2014. Graph-based Point-of-interest Recommendation with Geographical and Temporal Influences. In Proceedings of the 23rd ACM International Conference on Conference on Information and Knowledge Management (CIKM '14). Association for Computing Machinery, New York, NY, USA, 659-668.

Sankar, A., Wu, Y., Gou, L., Zhang, W., & Yang, H. (2018). "Dynamic graph representation learning via self-attention networks". Workshop on Representation Learning on Graphs and Manifolds, ICLR 2019.

Zhang, Siyuan (2018). "Routing and Recommendation with Spatio-temporal Data in Urban Area". The Chinese University of Hong Kong.

Shenglin Zhao, Tong Zhao, Haiqin Yangl, Michael R. Lyu, Irwin King (2016) STELLAR: Spatial-Temporal Latent Ranking for Successive Point-of-Interest Recommendation, Proceedings of the Thirtieth AAAI Conference on Artificial Intelligence (AAAI-16), 315-321.

Chen, D., Ong. C. S., & Xie, L. (Oct. 2016). Learning points and routes to recommend trajectories. In Proceedings of the 25th ACM International on Conference on Information and Knowledge Management (pp. 2227-2232).

Wang, H., Shen, H., Ouyang, W., & Cheng, X. (Jul. 2018). Exploiting POI-Specific Geographical Influence for Point-of-Interest Recommendation. In IJCAI (pp. 3877-3883).

Liu, Z., Zhou, D., & He, J. (Nov. 2019). Towards explainable representation of time-evolving graphs via spatial-temporal graph attention networks. In Proceedings of the 28th ACM international conference on information and knowledge management (pp. 2137-2140).

Zhao, P., Zhu, H., Liu, Y., Li, Z., Xu, J., & Sheng, V. S.. Where to go next: A spatio temporal LSTM model for next POI recommendation. Computer Science Preprint Archives, arXiv:1806.06671v1, Jun. 18, 2018.

Chen, J., Zhang, W., Zhang, P., Ying, P., Niu, K., & Zou, M. (2018). Exploiting spatial and temporal for point of interest recommendation. Complexity, 2018.

Chen, T., Yin, H., Nguyen, Q. V. H., Peng, W. C., Li, X., & Zhou, X. (Apr. 2020). Sequence-aware factorization machines for temporal predictive analytics. In 2020 IEEE 36th International Conference on Data Engineering (ICDE) (pp. 1405-1416). IEEE.

Qiang Liu, Shu Wu, Liang Wang, and Tieniu Tan. 2016. Predicting the Next Location: A Recurrent Model with Spatial and Temporal Contexts. In Proceedings of the Thirtieth AAAI Conference on Artificial Intelligence AAAI-16).

Petar Velickovic, Guillem Cucurull, Arantxa Casanova, Adriana Romero, Pietro Lio, and Yoshua Bengjio. 2018. Graph Attention Networks. In International Conference on Learning Representations (ICLR).

Pengpeng Zhao, Haifeng Zhu, Yanchi Liu, Jiajie Xu, Zhixu Li, Fuzhen Zhuang, Victor S. Sheng, and Xiaofang Zhou. 2019. Where to Go Next: A Spatio-Temporal Gated Network for Next POI Recommendation. In The Thirty-Third AAAI Conference on Artificial Intelligence (AAAI-19).

Welling, M., & Kipf, T. N. (2016). Semi-supervised classification with graph convolutional networks. In J. International Conference on Learning Representations (ICLR 2017).

Shi H. et al., Predicting Origin-Destination Flow via Multi-Perspective Graph Convolutional Network. 2020 IEEE 36th International Conference on Data Engineering (ICDE), Apr. 24, 2020.

Xie M. et al., "Graph-based Metric Embedding for Next POI Recommendation" WISE 2016: Proceedings of the 17th International Conference on Web Information Systems Engineering, Nov. 2, 2016, vol. 10042, pp. 207-222.

Xie et al., "Graph-based Metric Embedding for Next POI Recommendation", (15 pages).

Shi et al., "Predicting Origin-Destination Flow via Multi-Perspective Graph Convolutional Network", 2020 IEEE 36th International Conference on Data Engineering (ICDE), pp. 1818-1821.

Zhao et al., "Where to Go Next: A Spatio-temporal LSTM model for Next POI Recommendation", (8 pages).

International Preliminary Report on Patentability in Int. App. No. PCT/SG2020/050261, dated Feb. 3, 2022 (4 pages).

* cited by examiner

FIG 6

$$N_{G_P}^A(V_{u,m})^\tau = [1056, 32, 837, 10, 302, 112, 212, 53, 213, 665]$$
20%, 3%, 20%, 1%, 6%, 14%, 0%, 4%, 19%, 13%

600

METHOD FOR PREDICTING THE DESTINATION LOCATION OF A VEHICLE

TECHNICAL FIELD

Various aspects of this disclosure relate to methods for predicting the destination location of a vehicle.

BACKGROUND

Predicting the destination of a trip is a task in human mobility which finds several applications in real-world scenarios, from optimizing the efficiency of electronic dispatching systems to predicting and reducing traffic jams. In particular, it is of interest in context of e-hailing, which, thanks to the advance of smartphone technology, has become popular globally and enables customers to hail taxis using their smartphones.

For predicting a user's next destination, models such as a deep learning model based on a neural network may be trained to predict the user's next destination based on a user's visiting sequence. However, it is desirable to increase the accuracy of such approaches and achieve an accurate and reliable prediction of a vehicle's (or, equivalently, a user's) destination.

The publication "Graph Attention Networks" by Petar Velickovic et al., 2018, in International Conference on Learning Representations (ICLR) (in the following denoted by reference 1) describes graph attention networks (GATs), which are neural network architectures that operate on graph-structured data.

The publication "Semi-Supervised Classification with Graph Convolutional Networks" by Thomas N. Kipf and Max Welling et al., 2017, in International Conference on Learning Representations (ICLR) (in the following denoted by reference 2) describes graph convolutional networks (GCNs), which are neural network architectures that operate on graph-structured data.

SUMMARY

Various embodiments concern a method for predicting the destination location of a vehicle.

According to one embodiment, the method includes processing a local preference graph of a user of the vehicle having nodes corresponding to locations visited before by the user by a first graph neural network, processing one or more of a spatial graph representing information about geographical proximity of locations, a temporal graph representing information about locations which have been visited one after another by users and the time between the visits of the locations and a preference graph representing information about locations which have been visited one after another by users and the frequency of visits of the locations by a second graph neural network, combining the result of the processing by the first graph neural network and the result of the processing by the second graph neural network by at least one neural network layer and using the output of the at least one neural network layer as prediction of the destination location.

According to one embodiment the method further includes processing a user-user graph representing information about similarity of users in terms of the locations they have visited by a third graph neural network and combining the results of the processing by the third graph neural network with the result of the processing of the first graph neural network and the result of the processing of the third graph neural network by the at least one neural network layer.

According to one embodiment the spatial graph has nodes corresponding to locations, edges between nodes if the locations corresponding to the nodes are geographically near each other and edge weights depending on the geographical proximity of the locations corresponding to the nodes connected by the edges.

According to one embodiment the temporal graph has nodes corresponding to locations, edges between nodes if the locations corresponding to the nodes have been visited one after another based on the visits' timestamps and edge weights depending on the time between the visits of the locations corresponding to the nodes connected by the edges.

According to one embodiment the preference graph has nodes corresponding to locations edges between nodes if the locations corresponding to the nodes have been visited one after another in all users' historical sequential visits and edge weights depending on the frequency with which the locations corresponding to the nodes connected by the edges have been visited one after another.

According to one embodiment the user-user graph has nodes corresponding to users and edges between nodes if the similarity of the users corresponding to the nodes in terms of the locations they have visited is above a predetermined threshold.

According to one embodiment processing at least one of the spatial graph, the temporal graph and the preference graph includes selecting a sub-graph of the respective graph and feeding the sub-graph to the second graph neural network.

According to one embodiment selecting the sub-graph of a graph includes selecting nodes of the graph by one or more random walks through the graph.

According to one embodiment the one or more random walks depend on the edge weights of the graph.

According to one embodiment a multiplicity of random walks are performed on the graph and nodes which have been visited most in the random walks are selected for the sub-graph.

According to one embodiment processing at least one of the spatial graph, the temporal graph and the preference graph includes selecting a plurality of sub-graphs of the respective graph and feeding the sub-graphs to different sub-graph neural networks of the second graph neural network.

According to one embodiment selecting a plurality of sub-graphs for a graph includes selecting at least one sub-graph having nodes adjacent to one or more nodes of the vehicle's user's historical destination visit sequence and selecting at least one graph selected by at least one random walk through the graph.

According to one embodiment the method includes processing at least two of the spatial graph, the temporal graph and the preference graph by feeding, for each of the at least two graphs, a first sub-graph having nodes adjacent to one or more nodes of the vehicle's user's historical destination visit sequence to a first set of sub-graph neural networks, and a second sub-graph having nodes selected by one or more random walks to a second set of sub-graph neural networks, mean pooling the result of the first set of sub-graph neural networks, mean pooling the results of the second set of sub-graph neural networks and combining the results of the mean poolings by the one or more neural network layers.

According to one embodiment the at least one neural network layer includes at least one of a dropout layer and a linear layer.

According to one embodiment the method includes processing all of the spatial graph, the temporal graph and the preference graph by the second graph neural network.

According to one embodiment at least one of nodes corresponding to locations have trainable features, nodes corresponding to users have trainable features, the graph neural networks have trainable weights and the at least one neural network layer has trainable weights.

According to one embodiment the method includes setting one or more of the trainable features and the trainable weights by a training procedure using historical trips of the users.

According to one embodiment the method further includes selecting a vehicle for making a trip with the user depending on the predicted destination location from a plurality of candidate vehicles.

According to one embodiment the method includes predicting a travel distance from the prediction of the destination location and selecting the vehicle from the plurality of candidate vehicles depending on the predicted travel distance.

According to one embodiment the method includes selecting the vehicle from the plurality of candidate vehicles such that the selected vehicle has sufficient fuel or battery to travel the predicted travel distance.

According to various embodiments, a server computer is provided including a radio interface, a memory interface and a processing unit configured to perform the method of any one of the above embodiments.

According to one embodiment a computer program element is provided including program instructions, which, when executed by one or more processors, cause the one or more processors to perform the method of any one of the above embodiments.

According to one embodiment a computer-readable medium is provided including program instructions, which, when executed by one or more processors, cause the one or more processors to perform the method of any one of the above embodiments.

BRIEF DESCRIPTION OF THE DRAWINGS

The invention will be better understood with reference to the detailed description when considered in conjunction with the non-limiting examples and the accompanying drawings, in which:

FIG. 6 shows an attention plot for one out of the eight GNN layers for newly explored POIs (points of interest) a user has never visited before.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the devices or methods are analogously valid for the other devices or methods. Similarly, embodiments described in the context of a device are analogously valid for a vehicle or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

In the following, embodiments will be described in detail.

An e-hailing app, typically used on a smartphone, allows its user to hail a taxi (or also a private driver) through his or her smartphone for a trip.

Figure 1:
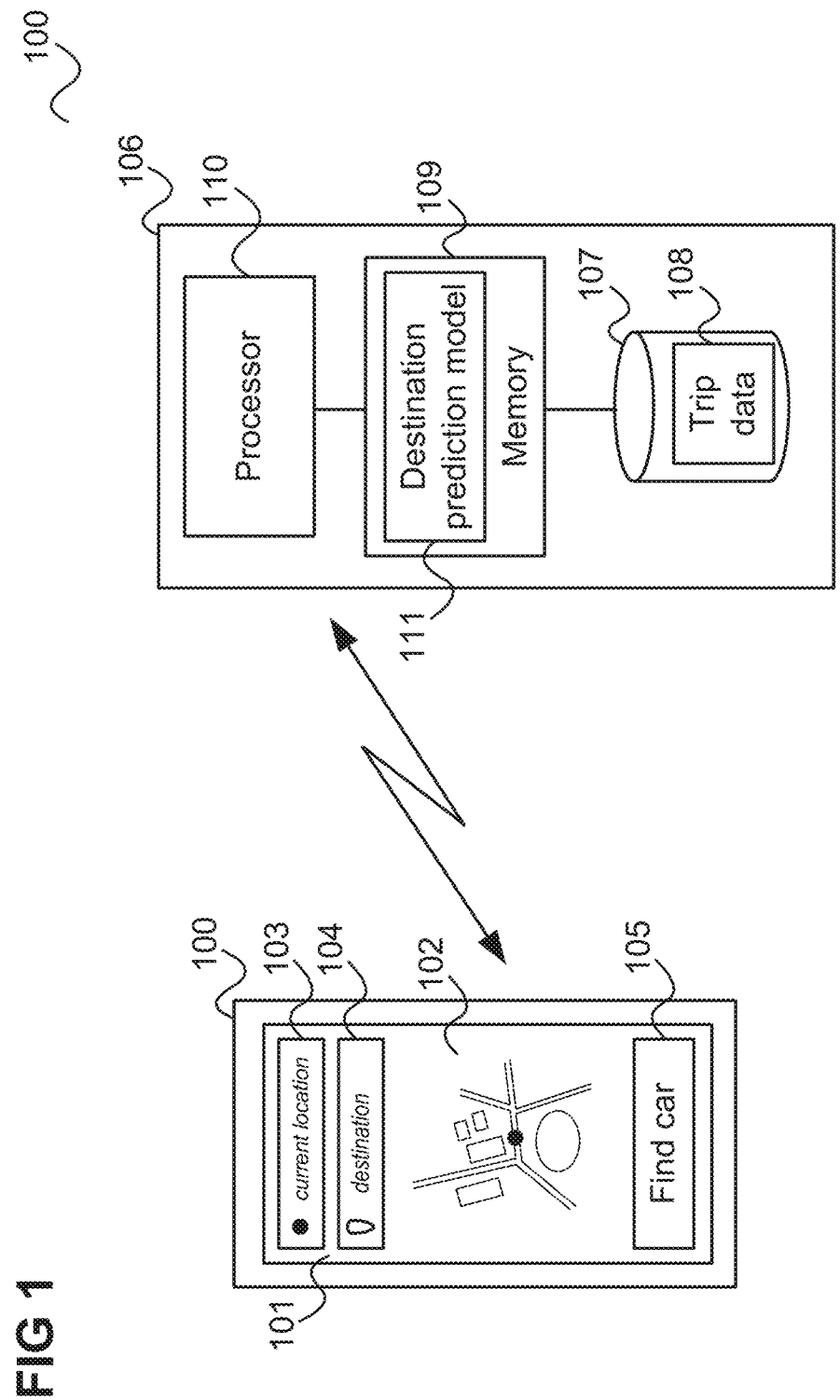
FIG. 1 shows a smartphone in communication with a server.

FIG. 1 shows a smartphone 100.

The smartphone 100 has a screen showing the graphical user interface (GUI) of an e-hailing app that the smartphone's user has previously installed on his smartphone and has opened (i.e. started) to e-hail a ride (taxi or private driver).

The GUI 101 includes a map 102 of the user's vicinity (which the app may determine based on a location service, e.g. a GPS-based location service). Further, the GUI 101 includes a field for point of departure 103 (which may be set to the user's present location obtained from location service) and a field for destination 104 which the user may touch to enter a destination (e.g. opening a list of possible destinations). There may also be a menu (not shown) allowing the user to select various options, e.g. how to pay (cash, credit card, credit balance of the e-hailing service). When the user has selected a destination and made any necessary option selections, he or she may touch a "find car" button 105 to initiate searching of a suitable car.

For this, the e-hailing app communicates with a server 106 of the e-hailing service via a radio connection. The server 106 includes a database 107 knowing the current location of registered drivers, when they are expected to be free, has information about traffic jams etc. From this information, a processor 110 of the server 106 determines the most suitable driver (if available) and provides a estimate of the time when the driver will be there to pick up the user, a price of the ride and how long it will take to get to the destination. The server communicates this back to the smartphone 100 and the smartphone 100 displays this information on the GUI 101. The user may then accept (i.e. book) by touching a corresponding button.

As mentioned above, when the user touches the destination field 104, the GUI 101 may display a list of possible destinations of the users' trip. According to various embodiments, this may include a list of predicted destinations.

This means that as the user opens the e-hailing application, the server 106 may predict the next POI or drop-off point the user intends to go (i.e. the destination of his or her trip) based on trip data (of previous trips) 108 which the server has in its database about this and other users. It should be noted that the database 107 may be distributed over various servers (e.g. be maintained by a cloud) which the server 106 may contact via a communication network.

The server 106 may have a memory 109 storing a trained destination prediction model 111 which the processor 110 may run to predict one or more next destinations of the user (e.g. a list of 10 most probable destinations of the user) from the user information 108.

For example, given the user's user ID and a list of historically POIs (drop-off points, i.e. destinations) of the user, which may be included in the user information for that user in the data base 107, the processor 110 may, by running the model 111, predict a ranked list of all the POIs with its respective probabilities on the likelihood of the user visiting that POI next. This means the model 111 scores all POIs in a region around the user to recommend POIs that the user may or may not have visited before, but could still be visiting in the future, making it a challenging task for the model 111 to learn. The processor 108 may then choose the highest ranked POI from the ranked list as the final destination recommendation/prediction and communicate it to the users' smartphone if only the best recommendation should be displayed to the user on his or her smartphone. Alternatively, the server 106 can similarly recommend the top 5 or 10 etc. POIs by extracting from the same ranked list accordingly.

According to various embodiments, the model 111 (and the corresponding method to predict or recommend POIs) is based on Spatial-Temporal-Preference (STP) factors. For example, it is assumed in the model 111 that a user is keen to visit a POI next because it is nearby (spatial), or may be because he or she would like to visit a cafe POI next after having lunch at a restaurant POI (temporal). Also, if the user has a preference of mostly visiting shopping malls, then the model 111 may be constructed or trained such that it is assumed in the model 111 that other shopping malls visited by other users could be helpful (preference). In view of these STP factors, in the following, three exemplary models (which may be used as model 111) are described with incremental improvements in terms of achievable prediction accuracy:

1) Local Preference GNN (LP-GNN)—This can be seen as a basic model that exploits user's local preferences but does not consider the STP factors mentioned and the visit patterns of other users.
2) Spatial-Temporal-Preference GNN (STP-GNN)—This can be seen as explore-exploit model which exploits users' local preferences (as done in LP-GNN) and explores new POIs which the user has never visited before (but could visit in future) from STP graphs constructed using both the adjacency and random walk masked self-attention options. By learning the explore-exploit tradeoffs during training of the model, this ensures that the user's local preferences are not ignored entirely.
3) Spatial-Temporal-Preference User GNN (STP-UGNN)—This can be seen as the most complex model of the three examples. It includes a User GNN to allow using information for a user from other similar users.

All three of the above exemplary models are implemented in form of a neural network including at least one Graph Neural Network (GNN). A Graph Neural Network is a sequence of Graph Neural Network Layers (also referred to as GNN layers in the following).

A GNN layer may for example be a GAT (Graph Attention Network) layer. The input of a GAT layer is a set of node feature vectors $h=\{\vec{h}_1, \vec{h}_2, \ldots, \vec{h}_N\}$ where N is the number of nodes of the graph processed by the GAT layer. The layer produces a new set of node features (of potentially different cardinality) as its output for each node. In order to obtain sufficient expressive power to transform the input features into higher-level features, the GAT layer includes a shared linear transformation which is parameterized by a weight matrix and applied to every node. Further, a shared attentional mechanism computes attention coefficients $\alpha_{ij}$ that indicate the importance of node j's features to node i.

Figure 2:
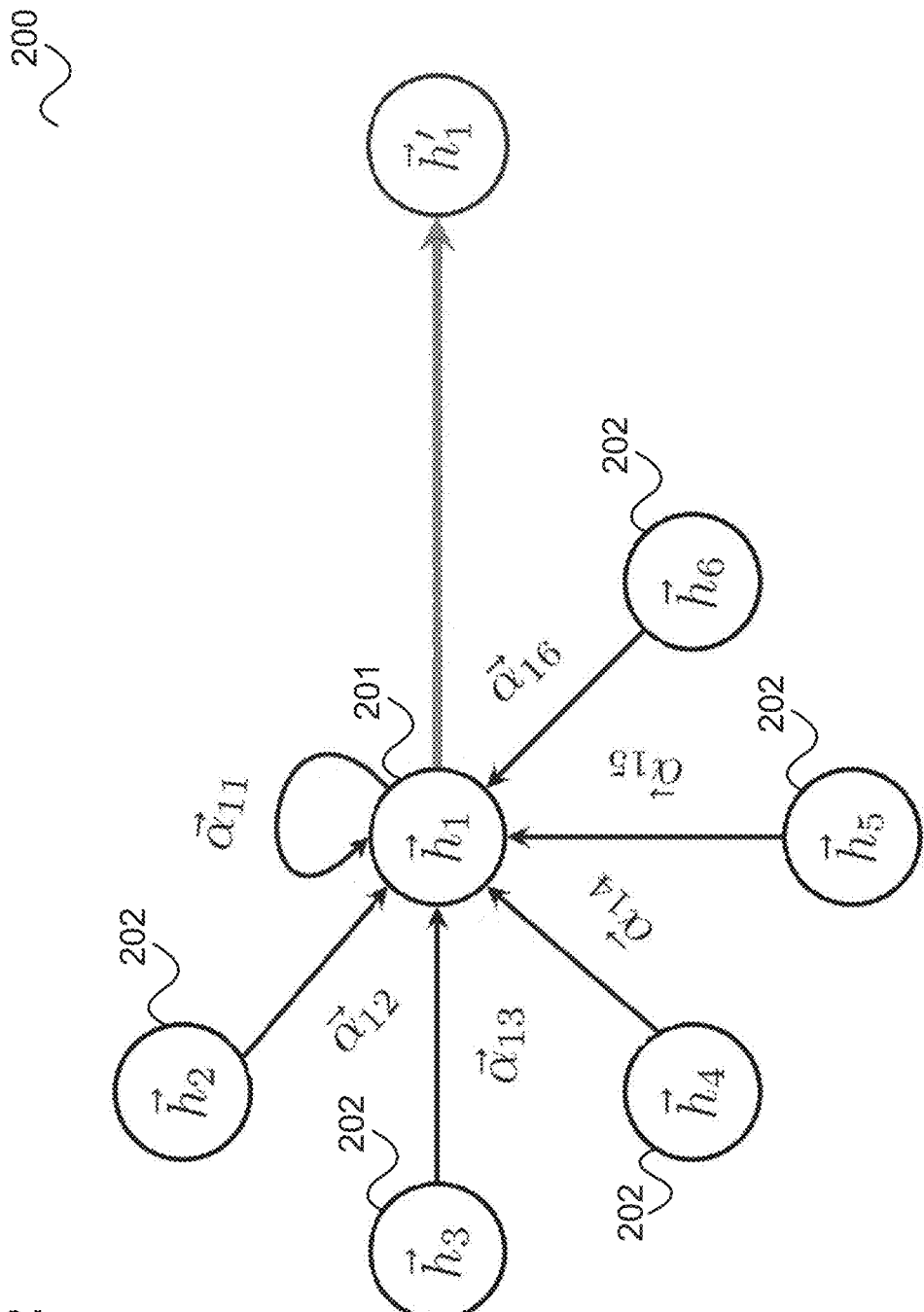
FIG. 2 illustrates the processing of a GAT (Graph Attention Network) layer for a graph node as an example of a GNN (Graph Neural Network) layer.

FIG. 2 illustrates the processing of a GAT layer for one node 201 as an example of a GNN layer.

The input features for the node 201 are given by an input feature vector $\vec{h}_1$. The output features for the node 201 are given by an output feature vector $\vec{h}'_1$. The attention coefficients $\alpha_{ij}$ define the impact of the feature vectors $\vec{h}_1$, $h_2, \ldots, \vec{h}_6$ of neighbouring nodes 202 in the graph on the output feature vector $\vec{h}'_1$.

The output feature vector of the ith node is for example calculated according to $$\vec{h}'_i = \sigma\left(\sum_{j \in \mathcal{N}_i} \alpha_{ij} W \vec{h}_j\right)$$

where $\mathcal{N}_i$ is some neighbourhood of the ith node in the graph and a is a nonlinear function such as ReLu. GAT layers and GATs as they may be used according to various embodiments are described in more detail in reference [1].

Alternatively or in addition, for example, Graph Convolutional Network layers may be used as described in more detail in reference [2]. One key difference of GCN and GAT is that GAT learns weights of adjacent nodes whereas GCN does not.

LP-GNN

Input:
  Previous POI (e.g. POI where the user is currently, i.e. has gone to last)
  Local Preference Graph
Output: Ranked list of all POIs for recommendation For an LP-GNN model, a local preference graph is constructed for each user, with each node representing a POI that the user has visited before and all nodes are fully connected because it is a complete graph, built from historical data. This graph serves to encapsulate the individual user's POI-POI relationships and semantics.

Thus, according to one embodiment, a Local Preference Graph is an undirected complete POI-POI graph for each user $u_m$, denoted as $u_m^G=(V_{u_m}, E_{u_m})$ where $V_{u_m}$ and $E_{u_m}$ are sets of POIs (coming from a training set) and unweighted edges, respectively. All pairs of POI vertices are connected, forming a complete graph.

Given a previous POI to predict the next POI for the user, the basic idea of a LP-GNN neural network, e.g. used as model 111 and one or more GNN layers, is to construct a numeric vector or a representation based on the neighbouring POIs of the previous POI from the local preference graph through weighted average, where the weights are learnt when the model is trained. This essentially allows the model to refer to other similar POIs in the local preference graph when computing a representation for the previous POI. Intuitively, the local preference graph serves as a form of domain knowledge to help the model compute a representation of the previous POI. With the representation as a numeric vector, the model then predicts a ranked list of POIs where the next POI actually visited should be highly ranked after training. For example, when a city has 10,000 POIs, the numeric vector specifies a probability distribution of all 10,000 values by softmax values (i.e. the vector has a dimension of 10,000. Sorting the components of the vector, e.g. in the descending order, gives the top K (e.g. the top 5 or 10) POIs for prediction or recommendation.

It should be noted that the LP-GNN model only considers the user specific local preference and does not consider STP factors based on the visiting patterns of other users. This may be sub-optimal.

STP-GNN

Figure 3:
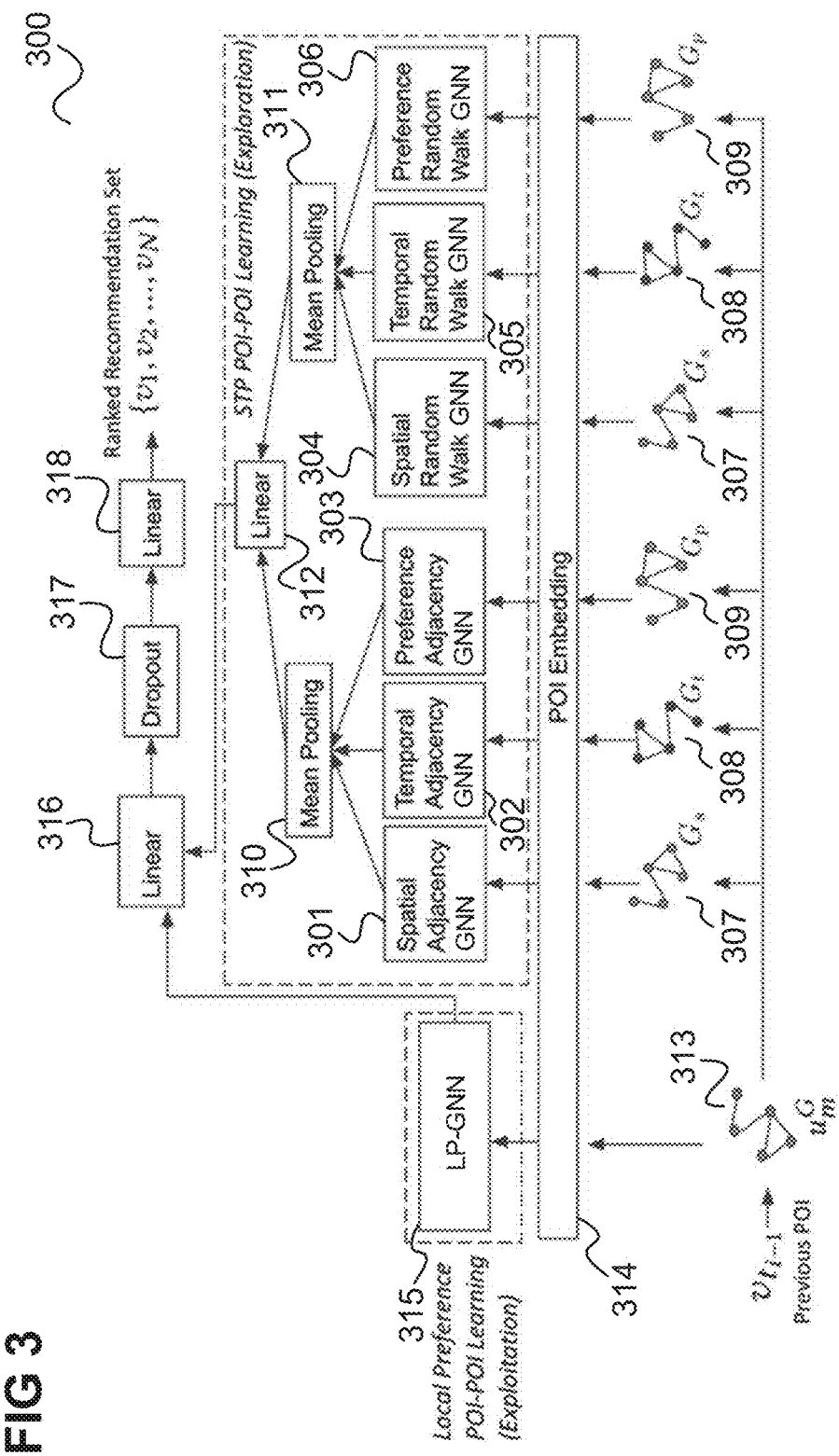
FIG. 3 shows an STP (spatial, temporal, preference)-GNN according to an embodiment.

Input:
  Previous POI
  Graphs (local preference, spatial, temporal and preference)
Output: Ranked list of all POIs for recommendation FIG. 3 shows an STP-GNN 300 according to an embodiment.

STP-GNN can be seen as an explore-exploit model that balances the exploitation of local preference factor, as done in LP-GNN, and exploration of new POIs which the user has never visited before via global STP factors, supported by the visiting patterns of other users. For example, if the user has a niche shopping mall local preference in how he/she visits POIs, this is well captured with LP-GNN and is important. However, he/she may visit new nearby (spatial) shopping malls, or new shopping malls tend to be visited closely in time by other users (temporal), or may be other new shopping malls visited by other users who like shopping malls (preference). Hence, the STP factors can help learn the relationships among POIs to support the recommendation task.

However, both local preference and global STP factors are incorporated because if the model only focuses on using information from new candidate POIs that the user has not visited, but might or might not visit in the future, the model would not be able to use (and learn during training) the local preference of the user, of which it can be assumed for certain that it is representative of the preference of the user. Similarly, if the model just uses the local preference factor, as done in LP-GNN, then it would not bother to explore new candidate POIs that could be spatially, temporally or preferentially similar. In both scenarios, they are sub-optimal. Hence, the STP-GNN according to various embodiments balances the exploitation of local preference and exploration of global STP factors.

For this, the following STP graphs are derived (e.g. by processor 110) from the local preference graph 313 for implementing a STP-GNN model (e.g. as model 111):

1) Spatial Graph 307: Nodes of POIs and they are connected if they are within the top 10 nearest POI based on the distance of their locations. This would essentially connect nearby POIs on a graph.

Thus, according to one embodiment, a Spatial Graph is an undirected POI-POI graph $G_s=(V_s, E_s)$ where $V_s$ and $E_s$ are sets of POIs and edges, respectively. A POI node $v_i$ has adjacency (i.e. an edge) to a POI node $v_j$ if the POI of $v_j$ is within the top $\sigma$ (e.g. $\sigma=10$) nearest POIs to the POI of $v_i$ based on the Euclidean distance $\Delta d=d(v_i, v_j)$. The edge weight between an adjacent pair is $$\frac{1}{\Delta d}.$$

2) Temporal Graph 308: Nodes of POIs and each pair of POIs are connected if they are visited next based on timestamps, regardless of the user. This aims to capture POIs that tend to be temporally related, such as going to a cafe after lunch at a restaurant. Thus, according to one embodiment, a Temporal Graph is an undirected POI-POI graph $G_t=(V_t, E_t)$ where $V_t$ and $E_t$ are sets of POIs (coming from the training set) and edges, respectively. A POI node $v_i$ has adjacency (i.e. an edge) to a POI node $v_j$ if the POI of $v_j$ has been a next visit from $v_i$ (in the training set). The edge between an adjacent pair is $$\frac{1}{\Delta \hat{t}}$$

where $\Delta \hat{t}$ is the average time interval between the visit of $v_i$ and the visit of $v_j$.

3) Preference Graph 309: Nodes of POIs and they are connected if they have been visited sequentially before by any user. This seeks to learn about the unique preferences of users e.g. shopping mall preference.

Thus, according to one embodiment, a Preference Graph is an undirected POI-POI graph $G_p=(V_p, E_p)$ where $V_p$ and $E_p$ are sets of POIs (coming from the training set) and edges, respectively. A POI node $v_i$ has adjacency (i.e. an edge) to a POI node $v_j$ if the POI of $v_j$ has been a next visit from $v_i$ (in the training set). The edge between an adjacent pair is $freq(v_i, v_j)$ where freq is the count function of POI pair occurrences.

Given the constructed STP graphs 307 to 309, according to one embodiment, the STP-GNN model includes six GNN layers 301 to 306 to compute a numeric vector or representation of an exploration phase, allocating three (301 to 303) to adjacency masked self-attention and three (304 to 306) to random walk masked self-attention. According to adjacency masked self-attention, a feature vector of a node has only impact on the output feature vector of another node if there is an edge between the two nodes.

According to random walk masked self-attention is used to attend higher-order neighbours on the STP graphs (i.e. nodes which are further apart than one edge) due to the drawbacks of the adjacency masked self-attention option in certain cases.

Figure 4:
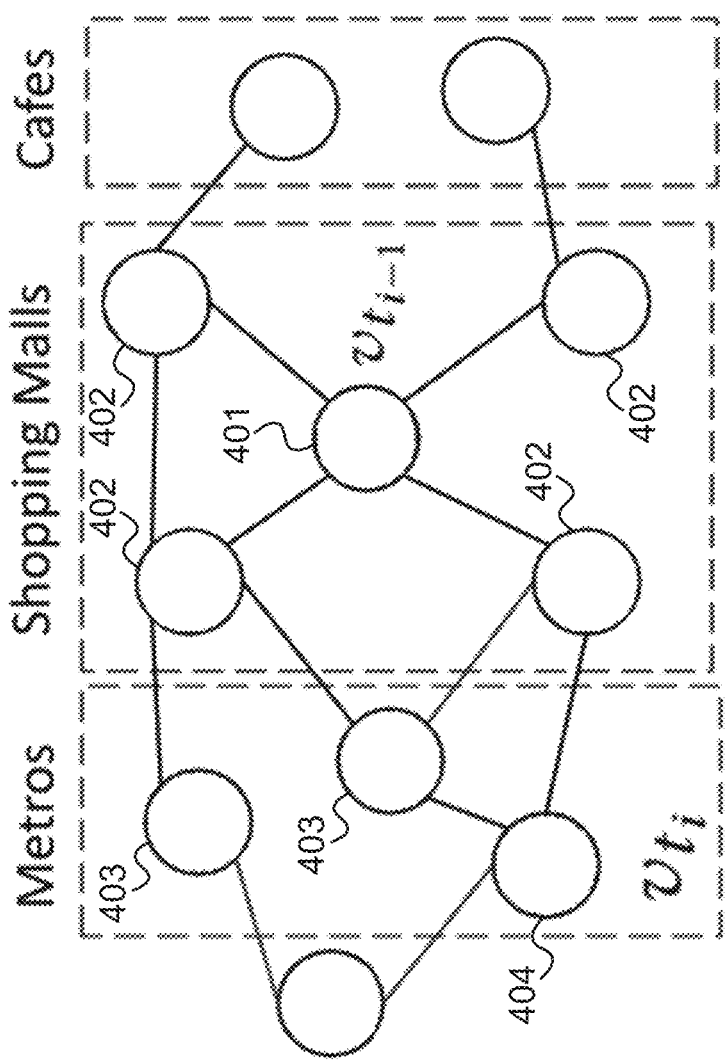
FIG. 4 illustrates a case where random walk masked self-attention may improve the prediction achieved by using adjacency masked self-attention.

FIG. 4 illustrates a case where random walk masked self-attention may improve the prediction achieved by using adjacency masked self-attention.

In the example shown, a shopping mall POI 401 is connected to other shopping mall POIs 402. Thus, by using only adjacency masked self-attention, only the feature of the shopping mall POIs 402 (i.e. first-order nodes) have an impact on the output feature vector or POI 401.

However, POIs that are not directly connected but nearby on the graph (i.e. higher-order nodes), such as a metro nodes 403, can help to better predict the next POI which is for example a metro 404. Therefore, according to various embodiments, random walk masked self-attention is used to consider nodes further away on the graph but yet relevant.

It should be noted that according to various embodiments, the six GNN layers 301 to 306 are not provided with a complete spatial graph 307, complete temporal graph 308 and complete preference graph 309 but are provided, by a POI embedding 314 (which can be seen as an input layer) with the following:
- the three GNN layers 301 to 303 allocated to the adjacency masked self-attention option are supplied as input with a subgraph (of the spatial graph 307, temporal graph 308 and preference graph 309, respectively including the considered POI node (e.g. the current POI of the user, i.e. the "previous" POI) and adjacent nodes (all adjacent nodes or at least those, e.g. 10, which are connected to the POI node with edges having the highest edge weights)
- the three GNN layers 304 to 306 allocated to the random walked masked self-attention option are supplied as input with a subgraph including the considered POI node (e.g. the current POI of the user, i.e. the "previous" POI) and nodes found by random walks through the spatial graph 307, temporal graph 308 and preference graph 309, respectively.

For example, for each of the graphs (i.e. spatial 307, temporal 308 and preference 309), the POI embedding 314 uses random walks to sample nodes in the respective graph 307 to 309 as input to the GNN layers 301 to 306. An example of the sampling process (e.g. for the spatial graph 307) is as follows:
a) Perform 1,000 random walks on the graph which leads to 1,000 lists of nodes. The number 1,000 is an example and may be calculated as the number of nodes in the respective graph (e.g. spatial graph 307) times the number of random walks to be started from each node.
b) Filter the 1,000 lists of nodes such that only lists are kept that contain at least one POI historically visited by the user (e.g. the 1,000 lists are filtered to 400 lists).
c) Perform a frequency ranking of the filtered lists to identify the top 10 POIs which are used as input to the respective GNN layer (e.g. GNN layer 304). These top 10 POIs would be the final sampled POIs.

This random walk-based generation of a subgraph is for example also done for the temporal graph 308 and the preference 309 such that the GNN layers 304, 305, 306 each have their own top 10 POIs generated from random walks. Thus, each of the six GNN layers 301 to 306 for example has a different set of 10 POIs as input.

According to one embodiment, as indicated above, the STP graphs 307 to 309 have edge weights. These may be used by the POI embedding 314 to bias the random walks. For example, in the spatial graph 307, random walks are biased to nearby POIs rather than POIs which are far away. This means that while performing the random walk, there are probabilities to guide the random walk which are for example based on the normalized edge weights of each graph. For example, given a node (POI) A, it has to be decided whether to traverse next to either node (POI) B or C. The edge weights $$\left(\text{e.g. } \frac{1}{\Delta d}\right.$$

for the spatial graph, wnere $\Delta d$ is the geographical distance between the POIs) of the pairs A→B and A→C are normalized into probabilities, such that it would be in 0 to 1 interval and the higher probability will be more likely chosen to perform the walk (e.g. A→C has higher probability as it has higher edge weight because they are nearer). Hence, this is dependent on the edge weight and is different for each STP graph as the edge weight definition is different for the STP graphs.

The outputs of the GNN layers 301 to 303 allocated to the adjacency masked self-attention option are combined via a first mean pooling 310 and the outputs of the three GNN layers 304 to 306 allocated to the random walked masked self-attention option are combined by a second mean pooling 311.

The results of the mean poolings 310, 311 are combined by a first linear layer 312.

In addition to the GNN layers 301 to 306 operating on STP (sub-)graphs, the STP-GNN 300 includes an LP-GNN 313 as described above.

The output of the LP-GNN 313 is combined with the output of the first linear layer 312 by a second linear layer 316.

Thus, a single STP representation built from the six GNN layers 301 to 306 that represent the exploration, is combined by the linear layer 316 with the LP-GNN result which represents the exploitation. The training of the second linear layer 316 allows learning weights that balances the explore-exploit trade-offs.

The result of the second linear layer 316 is processed by a dropout layer 317 and the remaining values are fed to a third linear layer 318 which produces a ranked set of POI predictions.

The dropout layer 317 to ignore certain parts of its input vector. For example, the second linear layer outputs a vector (e.g. [0.4, 0.1, 0.6, 0.3]) and the dropout layer deactivates certain part of the vector in order to force the model 300 to rely on the remaining part of the vector and yet still achieve good prediction performance. For the example, with a dropout probability of 0.5, the vector could become [0, 0.1, 0, 0.3], where the first and third components are "deactivated" or intentionally turned to zeros. In the next forward run of the overall model, other parts of the vectors are likely being deactivated (based on the dropout probability).

STP-UGNN

Figure 5:
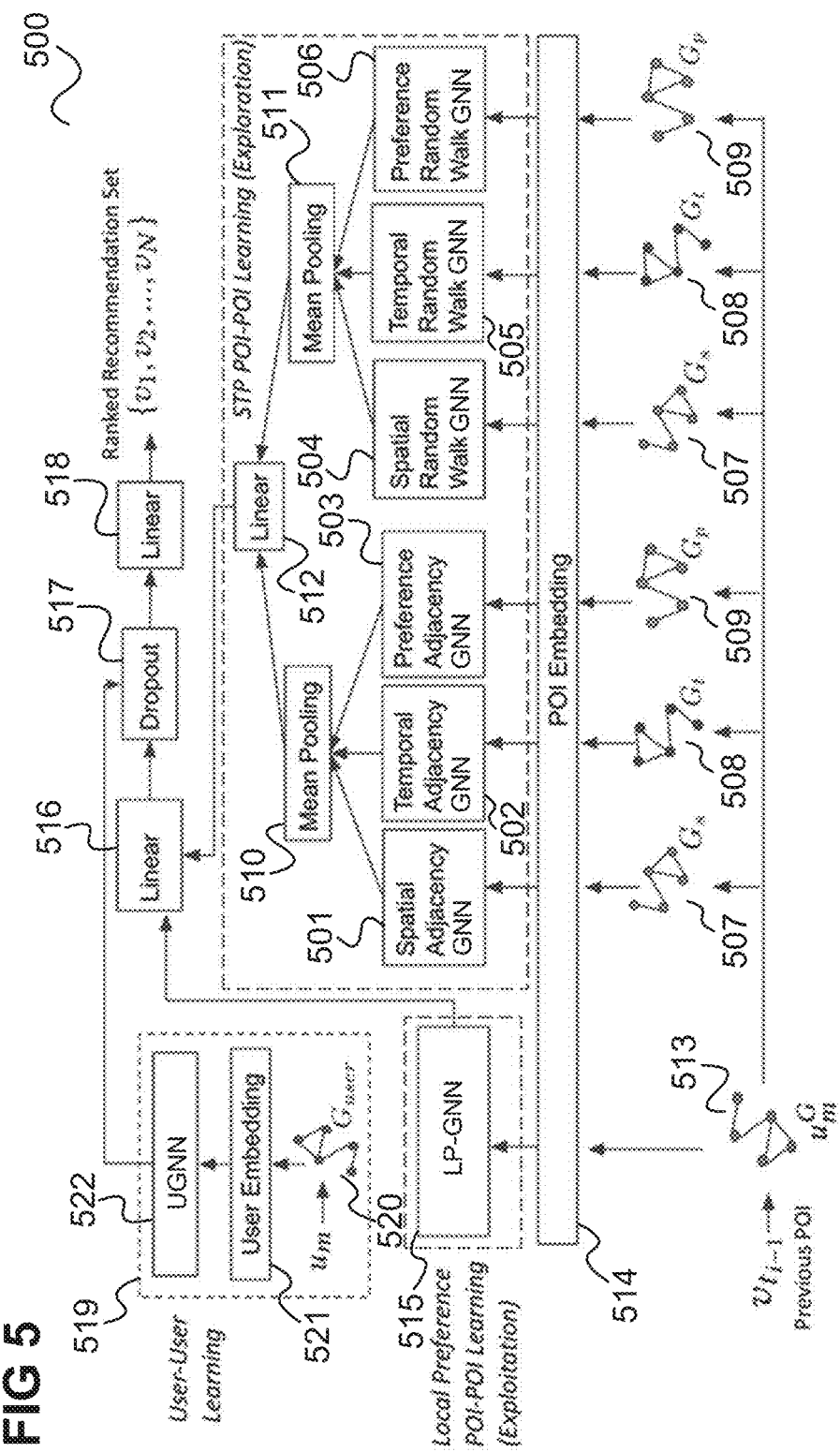
FIG. 5 shows an STP-UGNN (user GNN) according to an embodiment.

Input:
  Previous POI
  Graphs (local preference, spatial, temporal, preference, user)
Output: Ranked list of all POIs for recommendation FIG. 5 shows an STP-UGNN 500 according to an embodiment.

The STP-UGNN 500 can be seen as an extension of STP-GNN of FIG. 3. Accordingly, it includes components/operates on graphs 501 to 518 as the STP-GNN 300.

Including a numeric vector to represent the respective users when predicting the next POI is effective but may overfit the model to give only high probabilities to POIs the user has been before, but not other POIs. Therefore, the STP-UGNN 500 further includes a User GNN (UGNN) 519 with the goal of allowing the model to incorporate information (and learn) for a user from other similar users. For this the processor 110, for example, constructs a User Graph 520, where all nodes correspond to users and the nodes are connected if they have some similarity in their past POI visit sequence. The similarity of a first user with past visited POI set A to a second user with past visited POI set B is for example based on the Jaccard Similarity Coefficient $$J(A, B) = \frac{|A \cap B|}{|A \cup B|}$$

of their historically visited POIs. For example, two nodes are connected if they have a similarity above 0.2. The variables used for the similarity computation are just historical POIs for the users in the training set.

Thus, according to one embodiment, a User Graph is an undirected user-user graph $G_{user}=(V_{user}, E_{user})$ where $V_{user}$ and $E_{user}$ are sets of users (e.g. of all users) and edges, respectively. A user node $v_i$ has adjacency (i.e. an edge) to a user node $v_j$ if there Jaccard similarity coefficient is above, for example, 0.2.

Similar to how LP-GNN 200 and STP-GNN 300 apply GNN layers to learn POI-POI relationships, the UGNN 519 includes a GNN layer 522 to compute a representation for the user based on himself and his similar users, to incorporate (and learn during training) user-user relationships from the User Graph 520 provided by a user embedding layer 521 (which may be seen as an input layer).

The output of the UGNN's GNN layer 522 is fed (together with the output of the second linear layer 516) to the dropout layer 517 whose output is fed to the third linear layer 518 which produces the ranked set of POI predictions as described with reference to FIG. 3.

The UGNN' GNN layer 522 takes an input of a tuple of a node corresponding to a user and connected nodes in the user graph 520, i.e. nodes corresponding to similar users. Given the tuple, the GNN layer 522 computes a weighted sum (where the weights are trainable) of the user's feature vector to its similar users' feature vectors. This weighted sum is the output of the GNN layer 522. Thus, the weights of UGNN 519 can be seen to represent how much the model should extract from similar user's feature vectors for a user in order to perform well on the classification task.

It should be noted that the weights of all linear layers 312, 512, 316, 516, 318, 518 as well as the weights of the GNN layers 301 to 306, 501 to 506, 512 are trainable.

Furthermore, each graph node, whether corresponding to a POI or to a user, is a vector of weights that is learnt and tuned when the model is trained.

This means that the models 300, 500 may be trained using training data including multiple training data sets (each having a previous POI and a POI visited after the previous POI, i.e. a sequence of historical destination POIs, e.g. from an e-hailing service, such as previous trip data 108) to correctly predict the POI visited after a previous POI. After the training, the model may be used (e.g. by processor 110) to predict the POI that a user wants to go to (or that should be recommended to the user) from a previous POI (i.e. a POI that the user went to last or is currently at).

According to one embodiment, the next destination is predicted, based on the vehicle user's sequence of only all past destination points. According to one embodiment, all GNNs find adjacent nodes differently, e.g. LP-GNN uses only the previous destination location, STP-GNN uses not just the previous destination location, but the whole user's historical set of destination POIs and UGNN uses the user node itself to find adjacent similar users. In particular, according to one embodiment, for only STP graphs, the user's historical destination visit sequence that has several POIs is used, and respective sub-graphs are found individually, then a union of all the sub-graphs is taken to form a single sub-graph to be used. The idea is to rely on the whole historical sequence rather than just the previous POI to find STP POIs that can help the task. Hence, in case of STP graphs, not just the previous destination location, is used but all of the historical POIs for the respective user.

In particular, the user features of a node corresponding to a user of the user graph 520 is a vector of learnable weights to represent the user, which will be optimized during training such that the model performs well for the prediction task.

It should be noted that training data may be pre-processed to ensure robustness, e.g. POIs may only be kept if they have been visited by a certain amount of users (e.g. 10). Users may be kept even if they have little visit counts (e.g. fewer than 10).

It should further be noted that each of STP-UGNN's eight GNN layers 501 to 506, 515, 522 is interpretable. For instance, let POI #655 be a test sample to try to predict POI #894 (both metros) for user #574.

FIG. 6 shows the corresponding attention plot 600 for one out of the eight GAT layers (preference graph) for newly explored POIs the user has never visited before in an embodiment where the GNNs are implemented as GATs.

Figure 7:
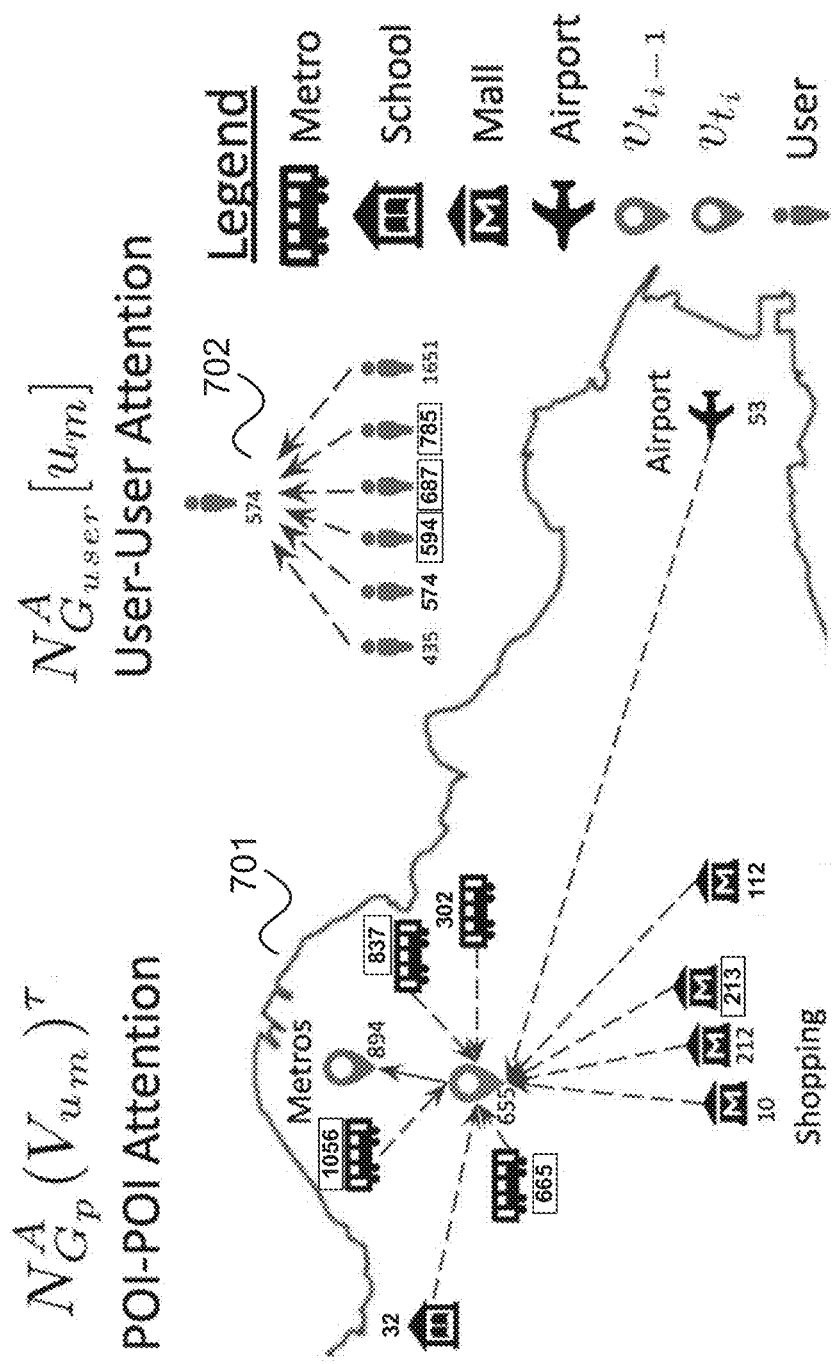
FIG. 7 show an attention plot for POI-POI attention and an attention plot for user-user attention.

FIG. 7 show an attention plot 701 for POI-POI attention and an attention plot 702 for user-user attention in an embodiment where the GNNs are implemented as GATs. The POIs and users with highest attention coefficients are highlighted by boxes. It can be seen that the STP-UGNN gives higher attention coefficients to mostly nearby metros, over distant malls and the airport. It can also be seen that for user #574 the model is attending more to users #594, #687 and #785 than the user himself/herself. This can be seen as validating the goal of STP-UGNN and supporting interpretability compared to conventional RNN (Recurrent Neural Network) models.

Figure 8:
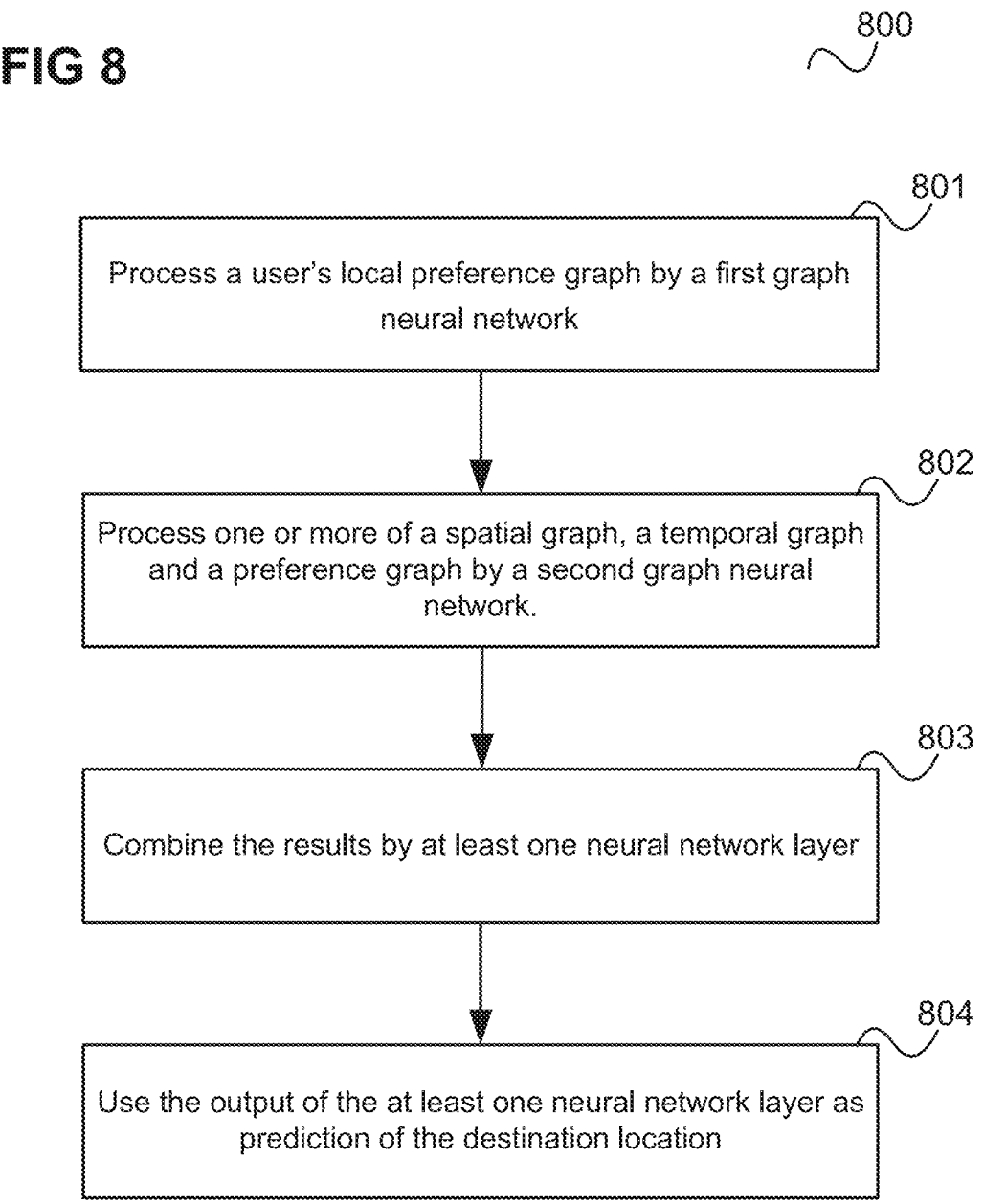
FIG. 8 shows a flow diagram illustrating a method for predicting the destination location of a vehicle according to an embodiment.

In summary, according to various embodiments, a method is provided as illustrated in FIG. 8.

FIG. 8 shows a flow diagram 800 illustrating a method for predicting the destination location of a vehicle, e.g. predicting the destination of a trip by a user e-hailing a vehicle.

In 801, a local preference graph of a user of the vehicle having nodes corresponding to locations visited before by the user is processed by a first graph neural network.

In 802, one or more of
- a spatial graph representing information about geographical proximity of locations,
- a temporal graph representing information about locations which have been visited one after another by users and the time between the visits of the locations and
- a preference graph representing information about locations which have been visited one after another by users and the frequency of visits of the locations are processed by a second graph neural network.

In 803, the result of the processing by the first graph neural network and the result of the processing by the second graph neural network are combined by at least one neural network layer.

In 804, the output of the at least one neural network layer is used as prediction of the destination location.

According to various embodiments, in other words, a local view of the user (local preference graph), i.e. information depending on a specific user, is combined with a global view (spatial graph, temporal graph, preference graph), i.e. information independent of users (spatial graph) or depending on all users (temporal graph and preference graph). The set of users may be given by the users of training data used for training the complete model, i.e. the complete neural network including the GNNs and the at least one neural network layer (and possibly further neural network components as described in the various examples and embodiments).

It should be noted that the method for predicting the destination location can use sequence of past destination locations or past origin destinations or both. Similarly, the training data may include sequence of past destination locations or past origin destinations or both. This means that the method may use and the training data may include past trip information that can consist of origin or destination locations or both.

According to one embodiment, the destination location is predicted by means of a model (e.g. the STP-UGNN described above) which is trained to learn POI-POI relationships from both local and global views based on spatial, temporal and preference factors by balancing the explore-exploit trade-offs. The STP-UGNN further includes a third graph neural network to learn (in training) and use (in deployment) user-user relationships to support the recommendation task.

According to one embodiment, the processing of the spatial graph, temporal graph, and/or preference graph (STP graphs) includes usage of a masked self-attention option of random walks that can leverage the graph structure to identify and attend higher-order neighbours as compared to just first-order neighbours in GNN.

Experiments show that new POIs which a user has never visited before but spatially, temporally or preferentially discovered during the exploration phase on the STP graphs can benefit the next POI recommendation task.

By predicting the destination of the trip, in particular the length of the trip can be predicted. This information can be used to select a vehicle which is assigned to make the trip, e.g. by checking whether the fuel level or battery level is sufficient for the predicted length of the trip.

The prediction of a destination for example allows controlling which vehicle (e.g. taxi) is assigned to a certain trip. A plurality of vehicles may in particular be controlled to minimize (or at least attempt to minimize) empty runs (or the total distance of empty runs) using destination predictions.

The prediction of destinations according to various embodiments may also be used for traffic management, e.g. to avoid traffic jams.

Additionally, suggesting a user a destination, e.g. a point-of-interest (POI) where he or she in fact wants to go next increases user-friendliness of, e.g. an e-hailing application. For example, the user is relieved of the burden of searching a map for the destination he or she wants to go or type the name of a destination he or she wants to go.

Figure 9:
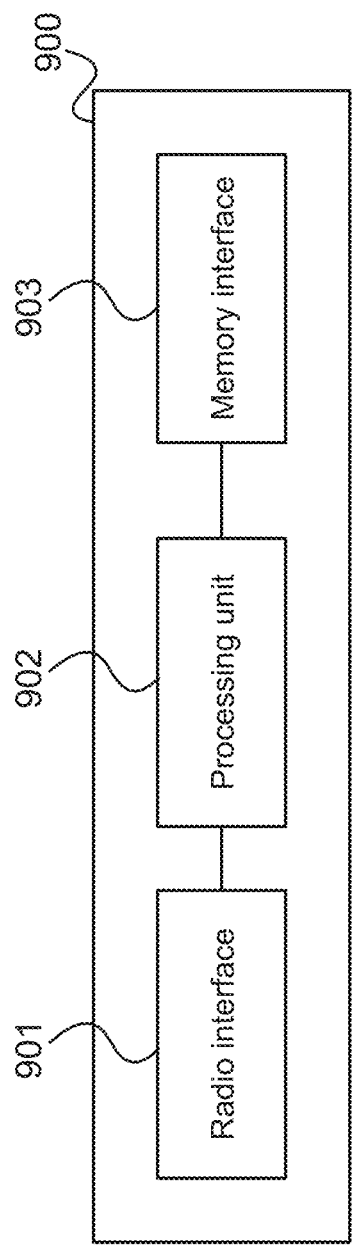
FIG. 9 shows a server computer according to an embodiment.

The method of FIG. 8 is for example carried out by a server computer as illustrated in FIG. 9.

FIG. 9 shows a server computer 900 according to an embodiment.

The server computer 900 includes a radio interface 1101 (e.g. configured for radio communication with the user's smartphone or generally a positioning device to determine the current location of the user, for example via a mobile radio communication network). The server computer 1100 further includes a processing unit 1102 and a memory interface 1103. The memory interface 1103 allows the processing unit 1102 to access an internal or external memory, e.g. storing information about POIs and users (which can be used as a basis to construct the various graphs) or storing the various graphs themselves. The server computer is configured to perform the method of FIG. 8.

The methods described herein may be performed and the various processing or computation units and devices described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor. A "circuit" may also be software being implemented or executed by a processor, e.g. any kind of computer program, e.g. a computer program using a virtual machine code. Any other kind of implementation of the respective functions which are described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for predicting a destination location of a vehicle, comprising:
   processing a local preference graph of a user of the vehicle having nodes corresponding to locations visited before by the user by a first graph neural network;
   processing a selected one or more of
      a spatial graph representing information about geographical proximity of locations;
      a temporal graph representing information about locations which have been visited one after another by a plurality of users and the time between the visits of the locations; and
      a preference graph representing information about locations which have been visited one after another and the frequency of visits of the locations;
   by a second graph neural network;
   combining the result of the processing by the first graph neural network and the result of the processing by the second graph neural network by at least one neural network layer; and
   using the output of the at least one neural network layer as prediction of the destination location.

2. The method of claim 1, further comprising processing a user-user graph representing information about similarity of users in terms of the locations they have visited by a third graph neural network and combining the results of the processing by the third graph neural network with the result of the processing of the first graph neural network and the result of the processing of the second graph neural network by the at least one neural network layer.

3. The method of claim 1, wherein the spatial graph has nodes corresponding to locations, edges between nodes if the locations corresponding to the nodes are geographically near each other, and edge weights depending on the geographical proximity of the locations corresponding to the nodes connected by the edges.

4. The method of claim 1, wherein the temporal graph has nodes corresponding to locations, edges between nodes if the locations corresponding to the nodes have been visited one after another based on a timestamp of each visit, and edge weights depending on the time between the visits of the locations corresponding to the nodes connected by the edges.

5. The method of claim 1, wherein the preference graph has nodes corresponding to locations edges between nodes if the locations corresponding to the nodes have been visited one after another in all users' historical sequential visits, and edge weights depending on the frequency with which the locations corresponding to the nodes connected by the edges have been visited one after another.

6. The method of claim 2, wherein the user-user graph has nodes corresponding to a plurality of users and edges between nodes if a similarity of the plurality users corresponding to the nodes in terms of the locations they have visited is above a predetermined threshold.

7. The method of claim 1, wherein processing a selected at least one of the spatial graph, the temporal graph and the preference graph comprises selecting a sub-graph of each selected graph and feeding the sub-graph to the second graph neural network.

8. The method of claim 7, wherein selecting the sub-graph of a selected graph comprises selecting nodes of the selected graph by one or more random walks through the selected graph.

9. The method of claim 8, wherein the one or more random walks depend on at least one or more edge weights of the selected graph.

10. The method of claim 8, wherein a multiplicity of random walks are performed on the selected graph and nodes which have been visited most in the random walks are selected for the sub-graph.

11. The method of claim 1, wherein processing at least one of the spatial graph, the temporal graph and the preference graph comprises selecting a plurality of sub-graphs of the selected graph and feeding the sub-graphs to different sub-graph neural networks of the second graph neural network.

12. The method of claim 11, wherein selecting the plurality of sub-graphs for a selected graph comprises selecting at least one sub-graph having nodes adjacent to one or more nodes of the vehicle's user's historical destination visit sequence and selecting at least one graph selected by at least one random walk through the selected graph.

13. The method of claim 1, further comprising processing at least two of the spatial graph, the temporal graph and the preference graph by feeding, for each of the at least two graphs, a first sub-graph having nodes adjacent to one or more nodes of the vehicle's user's historical destination visit sequence to a first set of sub-graph neural networks, and a second sub-graph having nodes selected by one or more random walks to a second set of sub-graph neural networks, mean pooling the result of the first set of sub-graph neural networks, mean pooling the results of the second set of sub-graph neural networks and combining the results of the mean poolings by the one or more neural network layers.

14. The method of claim 1, wherein the at least one neural network layer comprises at least one of a dropout layer and a linear layer.

15. The method of claim 1, further comprising processing all of the spatial graph, the temporal graph, and the preference graph by the second graph neural network.

16. The method of claim 1, wherein one or more of
nodes corresponding to locations have one or more trainable features,
nodes corresponding to the plurality of users have one or more trainable features,
the graph neural networks have one or more trainable weights and
the at least one neural network layer has one or more trainable weights.

17. The method of claim 1, further comprising setting one or more of at least one trainable feature and at least one trainable weight by a training procedure using historical trips of the plurality of users.

18. The method of claim 1, further comprising:
generating, based on the predicted destination location, a plurality of candidate vehicles; and
assigning, from the plurality of candidate vehicles, a vehicle for making a trip to the predicted destination location with the user.

19. The method of claim 18, further comprising predicting a travel distance from the predicted destination location and selecting the vehicle from the plurality of candidate vehicles depending on the predicted travel distance.

20. The method of claim 19, comprising selecting the vehicle from the plurality of candidate vehicles such that the selected vehicle has sufficient fuel or battery charge to travel the predicted travel distance.

21. A server computer comprising a radio interface, a memory interface, and a processing unit configured to perform the method of claim 1.

22. A computer-readable medium comprising program instructions, which, when executed by one or more processors, cause the one or more processors to perform a method for predicting the destination location of a vehicle, the method comprising:
processing a local preference graph of a user of the vehicle having nodes corresponding to locations visited before by the user by a first graph neural network;
processing one or more of
a spatial graph representing information about geographical proximity of locations;
a temporal graph representing information about locations which have been visited one after another by users and the time between the visits of the locations; and
a preference graph representing information about locations which have been visited one after another and the frequency of visits of the locations;
by a second graph neural network;
combining the result of the processing by the first graph neural network and the result of the processing by the second graph neural network by at least one neural network layer; and
using the output of the at least one neural network layer as prediction of the destination location.

* * * * *